Dec. 5, 1961 M. E. KANDELIN 3,011,481
TOOL
Filed Sept. 26, 1960 4 Sheets-Sheet 1

INVENTOR
MARTIN E. KANDELIN
BY
HIS ATTORNEY

Dec. 5, 1961 M. E. KANDELIN 3,011,481
TOOL
Filed Sept. 26, 1960 4 Sheets-Sheet 2
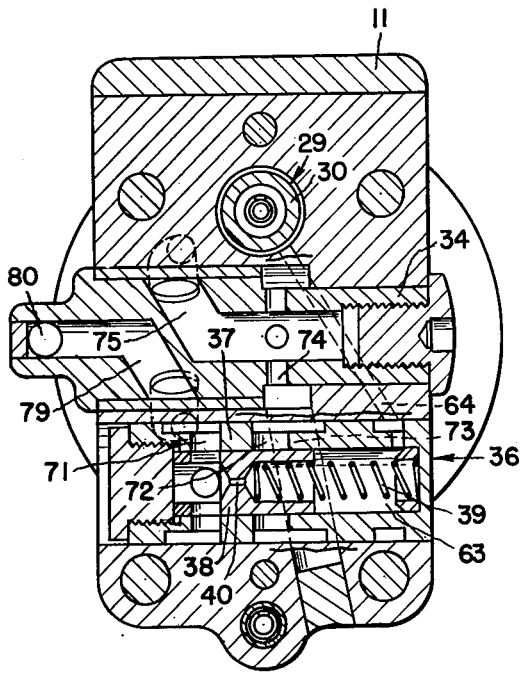
FIG. 2
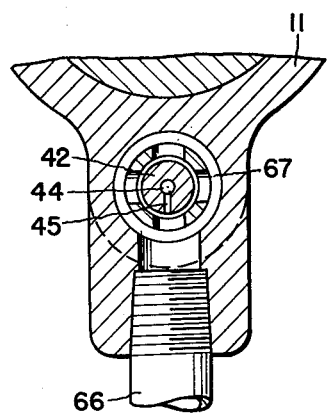
FIG. 3
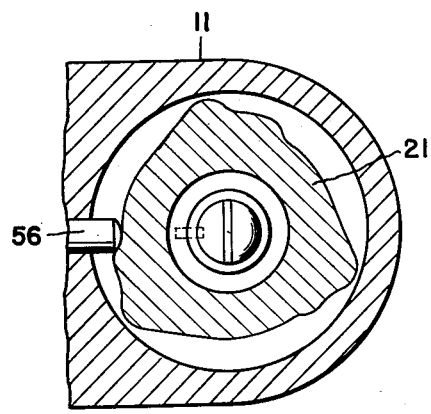
FIG. 4
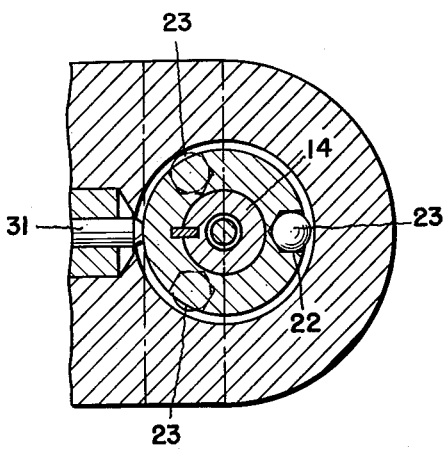
FIG. 5
INVENTOR
MARTIN E. KANDELIN
BY 
HIS ATTORNEY Dec. 5, 1961 M. E. KANDELIN 3,011,481
TOOL
Filed Sept. 26, 1960 4 Sheets-Sheet 3

INVENTOR
MARTIN E. KANDELIN
BY
HIS ATTORNEY

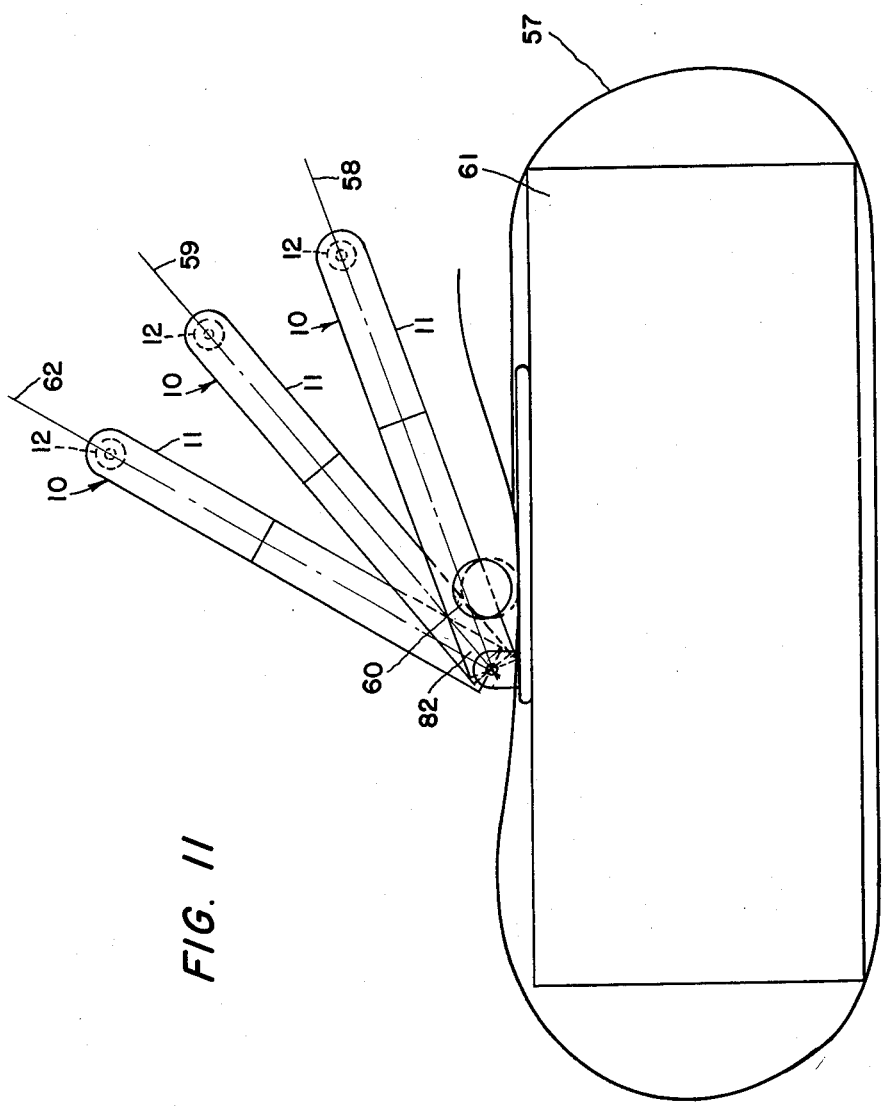

United States Patent Office 3,011,481
Patented Dec. 5, 1961

3,011,481
TOOL
Martin E. Kandelin, Athens, Pa., assignor to Ingersoll-Rand Company, New York, N.Y., a corporation of New Jersey
Filed Sept. 26, 1960, Ser. No. 58,479
3 Claims. (Cl. 121—35)

This invention relates to a tool and is primarily concerned with a tool for performing a plurality of different operations.

In the past it has been the practice in steel strapping packages to use one machine to draw the steel strap tight around the package and to use another machine to crimp the seal on the strap and to cut off the strap. It has also been the practice to have hand and power operated machines where all operations of steel strapping a package have been done by one machine but the machine was not compact.

The invention is a tool comprised of a barrel and a handle rotatably mounted on the barrel. A first cam is connected to the handle and a first rod is reciprocably mounted in the barrel. Upon rotation of the handle to a first position the first cam moves the first rod to perform a desired operation and upon rotation of the handle to a second position the first cam moves the first rod to perform another desired operation. A fluid motor is mounted in the barrel and a second cam is connected to the handle and a vent valve engages the second cam and a motor valve is in communication with the vent valve and a reversing valve is in communication with the motor valve. Upon rotation of the handle to a third position the second cam opens the vent valve to atmosphere causing the motor valve to open so that fluid under pressure flows through the motor valve and the reversing valve to the fluid motor to drive the fluid motor to perform another desired operation. A third cam is connected to the handle and a second rod is reciprocably mounted in the barrel and a fourth valve engages the second rod. Upon rotation of the handle to a fourth position the third cam moves the second rod to actuate the fourth valve to direct the fluid under pressure in another path to enable the performance of another desired operation.

An object of the invention is to provide a tool for performing a plurality of different operations that is more compact.

Another object of the invention is to provide a tool for performing a plurality of different operations that is more readily controlled.

The foregoing and other objects of the invention will be obvious from the following description and drawings wherein:

FIGURE 2 is a cross sectional view taken on the line 2—2 of FIGURE 1,

FIGURE 3 is a cross sectional view taken on the line 3—3 of FIGURE 1,

FIGURE 4 is a longitudinal sectional view taken on the line 4—4 of FIGURE 1,

FIGURE 5 is a longitudinal sectional view taken on the line 5—5 of FIGURE 1,

FIGURE 11 is an elevational view showing the tool used in applying steel strapping to a package.

Figure 1:
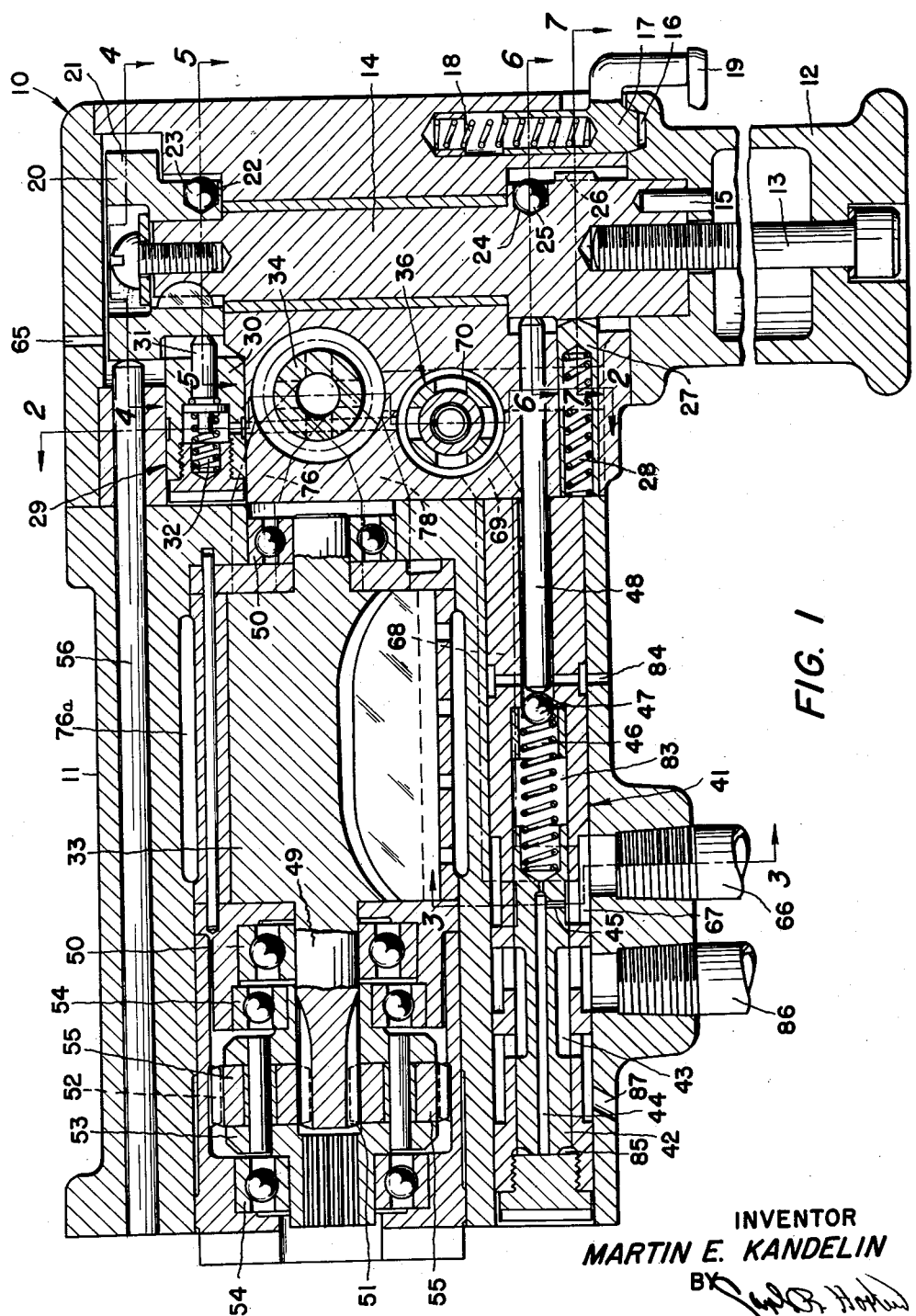
FIGURE 1 is a longitudinal sectional view of the tool.
Figure 6:
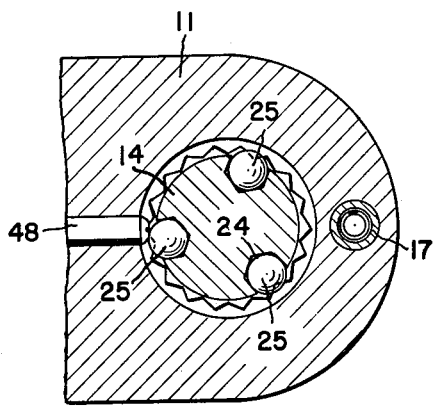
FIGURE 6 is a longitudinal sectional view taken on the line 6—6 of FIGURE 1.
Figure 7:
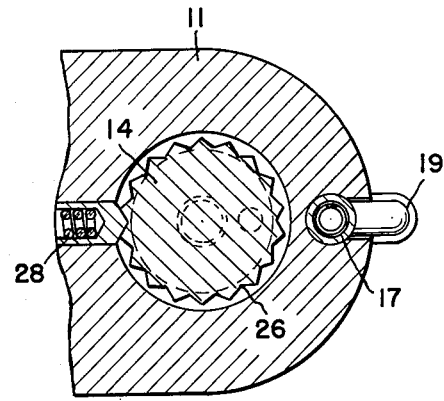
FIGURE 7 is a longitudinal sectional view taken on the line 7—7 of FIGURE 1.
Figure 8:
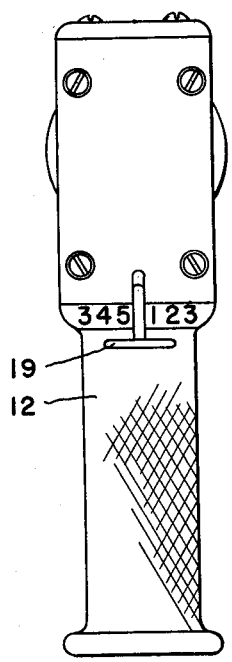
FIGURE 8 is an end view of the tool.
Figure 9:
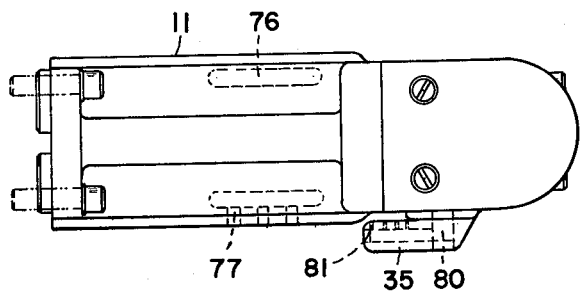
FIGURE 9 is a top plan view of the tool showing the primary exhaust ports.
Figure 10:
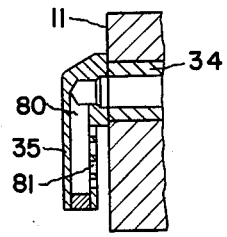
FIGURE 10 is a fragmentary longitudinal sectional view of the tool showing the reverse valve lever and the secondary exhaust ports.

In the drawing 10 generally designates a tool having a barrel 11 and a handle 12. A bolt 13 extends through the handle 12 and is threaded into a shaft 14. A dowel pin 15 fits into the handle 12 and the shaft 14 so that the handle and shaft cannot rotate relative to each other. The shaft 14 is rotatably mounted in the barrel 11. A recess 16 is formed in the handle 12 and a plunger 17 is reciprocably mounted in a recess in the barrel 11 and a coil spring 18 urges the plunger into the recess 16 so that normally the handle cannot be rotated relative to the barrel. A latch pad 19 is fixedly secured to the plunger 17 and is movable in a notch in the barrel 11 and by depressing the latch pad the plunger is lifted out of the recess 16 so that the handle 12 and shaft 14 can be rotated relative to the barrel 11. A part 20 is keyed and screw fastened on the end of the shaft 14 remote from the handle 12 and on this part is formed a cam 21 having an outline as shown in FIGURE 4 and the lower portion of this part has spaced recesses 22 and balls 23 are disposed in the recesses and these balls also act as cams as shown in FIG. 5. A plurality of recesses 24 are formed in the shaft 14 and balls 25 are disposed in these recesses and these balls act as cams, FIG. 6. The shaft 14 also has an enlarged portion integral therewith formed with longitudinal grooves 26 and a plunger 27 is reciprocably mounted in the barrel 11 and a coil spring 28 urges the plunger into one of the grooves, FIG. 7. A vent valve 29 is mounted in the barrel 11 and is made up of a housing 30 and a plunger 31 reciprocably mounted in the housing and a coil spring 32 in the housing which urges the plunger into engagement with the part 20. A fluid motor 33 is mounted in the barrel 11. A reversing valve 34 is rotatably mounted in the barrel 11 and has on its outer end a lever 35 so that by moving the reverse valve lever the direction of rotation of the fluid motor 33 can be either clockwise or counterclockwise. A motor valve 36 is comprised of a housing 37 and an element 38 reciprocably mounted in the housing and a coil spring 39 urging the element to the left as shown in FIGURE 2. The element 38 has an aperture 40 therethrough. A valve 41 is made up of a plunger 42 having an annular groove 43 therein and the plunger has an aperture 44 therethrough and a port 45 communicating with the aperture. A coil spring 46 engages the plunger 42 and a ball 47 and urges the plunger to the left and the ball against its seat all as shown in FIGURE 1. A rod 48 is reciprocably mounted in the barrel 11 and the ball 47 maintains the rod against the shaft 14. The fluid motor 33 has a drive shaft 49 supported in bearings 50 and the drive shaft has a pinion 51 on its end and an internal gear 52 is formed in the barrel 11 and a rotating member 53 is mounted in bearings 54. The rotating member 53 carries planet gears 55 which mesh with pinion 51 and internal gear 52. The pinion 51 and planet gears 55 and internal gear 52 effect a speed reduction from the drive shaft 49 to the rotating member 53.

The operation of the invention is as follows: The handle 12 has "N," "1," "2," "3," "4," and "5" marked thereon. The handle 12 has shown in FIGURE 1 in locked position, that is, in the "N" or neutral position. The latch pad 19 is pushed upwardly to get the plunger 17 out of the recess 16 which permits the handle 12 to be rotated. The tool 10 is on centerline 58 before position 1 as shown in FIGURE 11. The coil spring 28 urging plunger 27 into the grooves 26 enables the operator to get a feel of the operating positions of handle 12. The handle 12 is turned to position 1 which causes cam 21 to move the rod 56 toward the front end of the barrel 11 approximately 1/16". The rod 56 trips a mechanism mounted on the front end of the barrel 11 locking the free end of a steel strap 57 to the base of a steel strapping machine. After position 1 a spring shifts the tool 10 to centerline 59 as shown in FIGURE 11. The handle 12 is now rotated to position 2. This causes cam 21 to move rod 56 forward approximately another 1/16" which lowers a tension wheel 60 against the unanchored part of the steel strap 57 which has been looped around a package 61 and over the anchored end of the steel strap. The tool 10 is moved to a new location by the spring as shown by centerline 62 in FIGURE 11 before position 3. The handle 12 is then turned to position 3. One of the balls 23 acts as a cam and moves plunger 31 against the force of coil spring 32 allowing the fluid in space 63 in the motor valve to escape through the passage 64 connecting the motor valve and the vent valve 29. As the fluid flows through the vent valve 29 it flows around the plunger 31 and then through passage 65 to the atmosphere. Fluid under pressure enters the tool 10 at 66 and flows around the annular groove 67 through the passage 68 into port 69 around annular groove 70 into the motor valve 36 on the left side of the element 38 as viewed in FIGURE 2. This fluid under pressure shifts element 38 of the motor valve 36 to the right as viewed in FIGURE 2. This shifting of element 38 causes chambers 71 and 72 to be brought into communication with each other so that fluid under pressure flows from chamber 71 to chamber 72 into passage 73 through port 74 into the chamber 75 of the reversing valve 34 and out the reversing valve through passage 76 to the motor 33 to drive the motor. The motor 33 drives planet gears 55 around internal gear 52 to cause rotation of the rotating member 53. The rotating member 53 drives the mechanism 82 fixedly secured on the front end of the barrel 11 and this mechanism turns the tension wheel 60 in the tensioning direction on the steel strap 57 and the motor is kept running until it stalls. The primary exhaust from the motor 33 flows into annular space 76a and through holes 77 in the side of the barrel 11 to the atmosphere. The secondary exhaust flow is from motor 33 through passage 78 to the chamber 79 in the reversing valve 34 and through passage 80 in lever 35 out through holes 81 in the lever. The handle 12 is now rotated to position 4. This causes the coil spring 32 to move plunger 31 to the right as shown in FIGURE 1 thus closing the vent valve 29. Fluid under pressure flows from chamber 71 through aperture 40 into chamber 63 and pressure builds up in the latter chamber and this fluid pressure together with the force of the coil spring 39 shifts the element 38 to the left as viewed in FIGURE 2 thus closing the motor valve 36. This position is to allow the operator to inspect the work to see how it is progressing. If the operator desires to lessen the tension on the steel strap 57 the reversing valve lever 35 is turned to reverse the direction of rotation of the motor 33 and then the handle 12 is turned back to position 3 to operate the motor and lessen the tension on the steel strap. When the lever 35 is turned to reverse the direction of rotation of the motor 33 the fluid under pressure enters the motor through passage 78 and flows out the primary exhausts 76a and 77 and the secondary exhaust is through passage 76 and passage 80 in the reversing lever 35 and out the holes 81 in the reversing lever. The handle 12 is now rotated to position 5. One of the balls 25 acts as a cam and moves the rod 48 forwardly unseating the ball 47 and venting chamber 83 through port 84 to the atmosphere. This allows the plunger 42 to shift to the right as viewed in FIGURE 1. Fluid under pressure had previously flowed through port 45 and aperture 44 into annular groove 85 and the fluid under pressure in annular groove 85 overcomes the force of the coil spring 46 causing the plunger 42 to shift to the right. Fluid under pressure then flows from conduit 66 around annular groove 43 to conduit 86 to a sealing cylinder which feeds and crimps the strap seal and cuts off the coil end of the steel strap 57. The handle 12 is then turned to position "N" to complete the cycle. The coil spring 46 moves the rod 48 to the right as viewed in FIGURE 1 and seats ball 47. The coil spring 46 together with fluid pressure in chamber 83 moves plunger 42 to the left as viewed in FIGURE 1. This causes conduit 86 to be in communication with the atmosphere through annular groove 43 and exhaust port 87. This tool is more readily controlled than a mechanical linkage type of tool since all of the controls are in one handle. This tool is also more compact than tools for steel strapping packages that have been used in the past.

What is claimed is:

1. A tool comprising a barrel, a handle rotatably mounted on the barrel, a first rod reciprocably mounted in the barrel, a first cam connected to the handle, upon rotation of the handle the first cam moving the first rod to perform a desired operation and upon rotation of the handle to a second position the first cam moving the first rod to perform another desired operation, a fluid motor, a second cam connected to the handle, a first valve means mounted in the barrel and in communication with a source of fluid under pressure, upon rotation of the handle to a third position the second cam actuating the first valve means to allow fluid under pressure to flow to the fluid motor to drive the fluid motor to perform another desired operation, a third cam connected to the handle, a second rod reciprocably mounted in the barrel, and a second valve means in communication with the source of fluid under pressure, upon rotation of the handle to a fourth position the third cam actuating the second valve means to allow fluid under pressure to flow in another direction to enable the performance of another desired operation.

2. A tool comprising a barrel, a handle rotatably mounted on the barrel, a shaft secured to the handle and extending into the barrel, a first cam secured to the shaft, a first rod reciprocably mounted in the barrel and engaging the first cam, upon rotation of the handle to a first position the first cam moving the first rod toward the front end of the barrel to perform a desired operation and upon rotation of the handle to a second position the first cam moving the first rod outwardly of the front end of the barrel to perform another desired operation, second cam fixedly secured to the shaft, a fluid motor, a reversing valve movably mounted in the barrel and in communication with the fluid motor, a motor valve movably mounted in the barrel, a vent valve movably mounted in the barrel and engaging the second cam, upon rotation of the handle to a third position the second cam moving the vent valve and allowing fluid in the motor valve to flow through the vent valve to atmosphere causing the motor valve to shift allowing fluid under pressure to flow through the motor valve and through the reversing valve to the motor to drive the motor to perform another desired operation, a third cam fixedly secured to the shaft, a second rod reciprocably mounted in the barrel and engaging the third cam, and a fourth valve reciprocably mounted in the barrel and engaging the second rod, upon rotation of the handle to a fourth position the third cam moving the second rod causing the fourth valve to shift allowing fluid under pressure to flow in another direction to enable the performance of another desired operation.

3. A tool comprising a barrel, a handle movably mounted on the barrel, a first rod reciprocably mounted in the barrel, a first means connected to the handle, upon movement of the handle the first means moving the first rod to perform a desired operation and upon movement of the handle to a second position the first means moving the first rod to perform another desired operation, a fluid motor, a second means connected to the handle, a first valve means mounted in the barrel and in communication with a source of fluid under pressure, upon movement of the handle to a third position the second means actuating the first valve means to allow fluid under pressure to flow to the fluid motor to drive the fluid motor to perform another desired operation, a third means connected to the handle, a second rod reciprocably mounted in the barrel, and a second valve means in communication with the source of fluid under pressure, upon rotation of the handle to a fourth position the third means actuating the second valve means to allow fluid under pressure to flow in another direction to enable the performance of another desired operation.

References Cited in the file of this patent

UNITED STATES PATENTS

| | | |
|---|---|---|
| 2,929,608 | Zippel | Mar. 22, 1960 |
| 2,934,318 | Schultz | Apr. 26, 1960 |
| 2,936,156 | Coupland | May 10, 1960 |